United States Patent
Kimura et al.

(10) Patent No.: US 7,904,245 B2
(45) Date of Patent: Mar. 8, 2011

(54) METHOD AND VEHICLE REACTING TO THE DETECTION OF AN IN-PATH OBSTACLE

(75) Inventors: Takeshi Kimura, Yokohama (JP);
Yosuke Kobayashi, Yokohama (JP);
Genpei Naito, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 342 days.

(21) Appl. No.: 10/591,467

(22) PCT Filed: Mar. 2, 2005

(86) PCT No.: PCT/JP2005/004026
§ 371 (c)(1),
(2), (4) Date: Sep. 1, 2006

(87) PCT Pub. No.: WO2005/084993
PCT Pub. Date: Sep. 15, 2005

(65) Prior Publication Data
US 2007/0192006 A1    Aug. 16, 2007

(30) Foreign Application Priority Data
Mar. 3, 2004   (JP) ............... P2004-059021

(51) Int. Cl.
*G08G 1/16* (2006.01)
(52) U.S. Cl. .............. 701/301; 701/45; 701/96; 340/436
(58) Field of Classification Search ............ 701/45, 701/96, 301
See application file for complete search history.

(56) References Cited

U.S. PATENT DOCUMENTS

| | | |
|---|---|---|
| 5,699,040 A | 12/1997 | Matsuda |
| 5,995,037 A | 11/1999 | Matsuda et al. |
| 6,021,375 A * | 2/2000 | Urai et al. ............ 701/301 |
| 6,609,741 B2 | 8/2003 | Kim |
| 6,624,747 B1 * | 9/2003 | Friederich et al. ....... 340/436 |
| 6,926,374 B2 * | 8/2005 | Dudeck et al. ........... 303/191 |
| 2003/0060936 A1 | 3/2003 | Yamamura et al. |
| 2003/0067219 A1 * | 4/2003 | Seto et al. ............ 303/193 |
| 2003/0233902 A1 | 12/2003 | Hijikata |
| 2003/0236608 A1 | 12/2003 | Egami |
| 2005/0279554 A1 | 12/2005 | Kobayashi et al. |

FOREIGN PATENT DOCUMENTS

| | | |
|---|---|---|
| EP | 0 991 045 A2 | 4/2000 |
| EP | 1 057 159 B1 | 5/2002 |
| EP | 1 300 275 A1 | 4/2003 |
| JP | 5-24519 A | 2/1993 |
| JP | 7-057182 A | 3/1995 |
| JP | 8-161697 A | 6/1996 |
| JP | 8-263794 A | 10/1996 |
| JP | 9-145737 A | 6/1997 |
| JP | 11-023705 A | 1/1999 |

(Continued)

*Primary Examiner* — Mark Hellner
*Assistant Examiner* — Helal A Algahaim
(74) *Attorney, Agent, or Firm* — Foley & Lardner LLP

(57) ABSTRACT

A method and system for assisting a driver operating a vehicle traveling on a road includes determining an obstacle as a target obstacle in the path of the vehicle and providing information on the target obstacle, regulating at least one of a reaction force input (F) to the driver, a driving force applied to the vehicle and a braking force applied to the vehicle in response to a control amount determined; measuring a width of the target obstacle; and correcting the control amount based on the measured width (w).

24 Claims, 17 Drawing Sheets

FOREIGN PATENT DOCUMENTS

| | | |
|---|---|---|
| JP | 2000-343980 A | 12/2000 |
| JP | 2003-063430 A | 3/2003 |
| JP | 2003-112618 A | 4/2003 |
| JP | 2003-173500 A | 6/2003 |
| JP | 2003-246225 A | 9/2003 |
| JP | 2003-327018 A | 11/2003 |
| JP | 2004-038245 A | 2/2004 |
| WO | WO 02/058955 A1 | 8/2002 |

* cited by examiner

METHOD AND VEHICLE REACTING TO THE DETECTION OF AN IN-PATH OBSTACLE

TECHNICAL FIELD

1. Related Application

The present application claims the benefit of priority from Japanese Patent Application No. 2004-59021, filed Mar. 3, 2004, which application is hereby incorporated by reference in its entirety.

2. Field of the Disclosure

The present invention relates to a method and system for transmitting a detected in-path target obstacle to a driver of a vehicle.

BACKGROUND ART

The conventional art describes various methods and systems for assisting a driver of a vehicle. One example of such a system is described in US 2003/0060936 A1, published Mar. 27, 2003. This system comprises a data acquisition system acquiring data including information on status of a vehicle and information on environment in a field around the vehicle, a controller, and at least one actuator. The controller determines a future environment in the field around the vehicle using the acquired data, for making an operator response plan in response to the determined future environment, which plan prompts the operator to operate the vehicle in a desired manner for the determined future environment. The actuator is coupled to a driver controlled input device to mechanically affect operation of the input device in a manner that prompts, via a haptic input from the driver controlled input device, the driver to operate the vehicle in the desired manner.

Another example of such a system is described in JP05-024519. This system assists a driver of a vehicle by automatically applying wheel brakes if there is a high chance that a vehicle may come into contact with the preceding obstacle in front of the vehicle. The automatically applied wheel brakes are quickly released upon determination of a driver's lane change intention.

One concern raised by this system is that the quick release of the automatically applied wheel brakes may provide an input not totally acceptable to the driver.

A need remains for an improved method and system for transmitting a detected in-path target obstacle to a driver of a vehicle without providing any unacceptable input to the driver.

SUMMARY OF THE INVENTION

According to one aspect of the present invention, there is provided a system for assisting a driver for operating a vehicle traveling on a road, the system comprising a device arrangement determining an obstacle as a target obstacle in a path of the vehicle and providing information on the target obstacle and width of the target obstacle. A device detects the status of the vehicle. A device is provided that determines a risk that the vehicle may come into contact with the target obstacle based on the information on the target obstacle and the detected status of the vehicle. A control arrangement is provided that regulates at least one of a reaction force input to the driver and a force applied to the vehicle based on the determined risk and the width of the target obstacle.

DETAILED DESCRIPTION OF THE INVENTION

Figure 1:
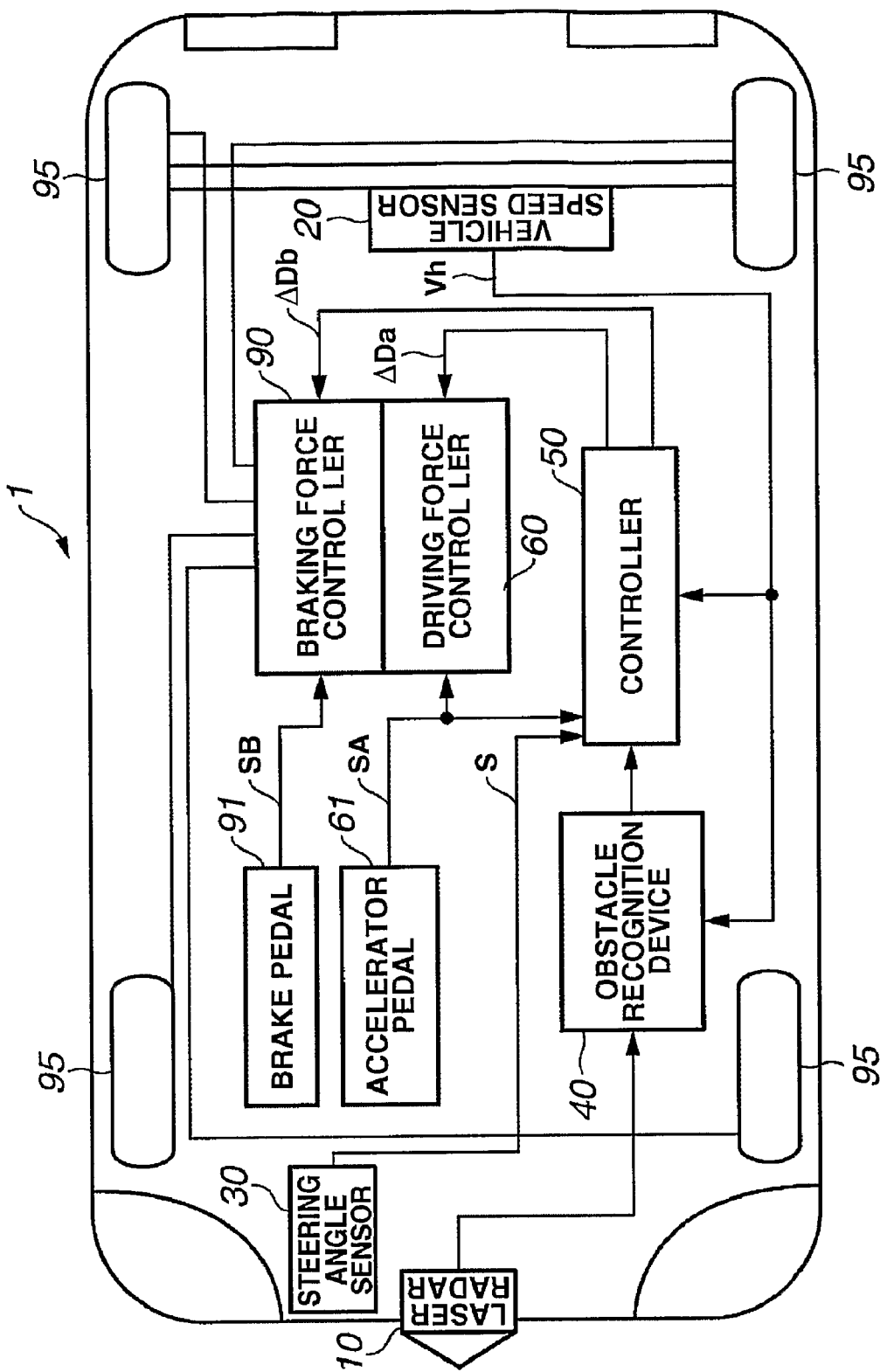
FIG. 1 is a block diagram of a motor vehicle equipped with a system according to embodiments of the present invention.

The accompanying drawings illustrate various exemplary embodiments of a method and system according to the present invention. Like reference numerals are used throughout each Figure to designate like parts or portions.

With reference to FIG. 1, a radar 10 is positioned at a center of a front grill or a front bumper of a vehicle 1 for transmitting pulsed beam or radar waves ahead of the vehicle 1 in order to detect obstacles within the field of view of the radar 10. Although it may be a conventional millimeter wave, frequently modulated continuous (FMCW) radar, the radar 10, in this 30 embodiment, is a conventional infrared laser radar. An infrared pulsed beam travels, as a transmitted beam, toward a measurement zone. A light receiving device receives the transmitted beam returning from an obstacle inside the measurement zone. Due to the use of a rotating polygonal mirror, two-dimensional scanning in the forward direction is possible, so that the pulsed beam can be swiveled horizontally due to the rotation of the polygonal mirror, and the pulsed beam can be swiveled vertically due to a plurality of mirror surfaces of the polygonal mirror inclined at different angles. In the embodiment, the pulsed beam can be swiveled horizontally and laterally about 6 degrees to each side of a longitudinal line passing through the center of the vehicle 1.

Based on the time delay and phase difference between the transmitted beam from the laser radar 10 and the received reflected beam, control logic can determine a distance and azimuth angle between each of the detected obstacle(s) and the vehicle 1.

Figure 2:
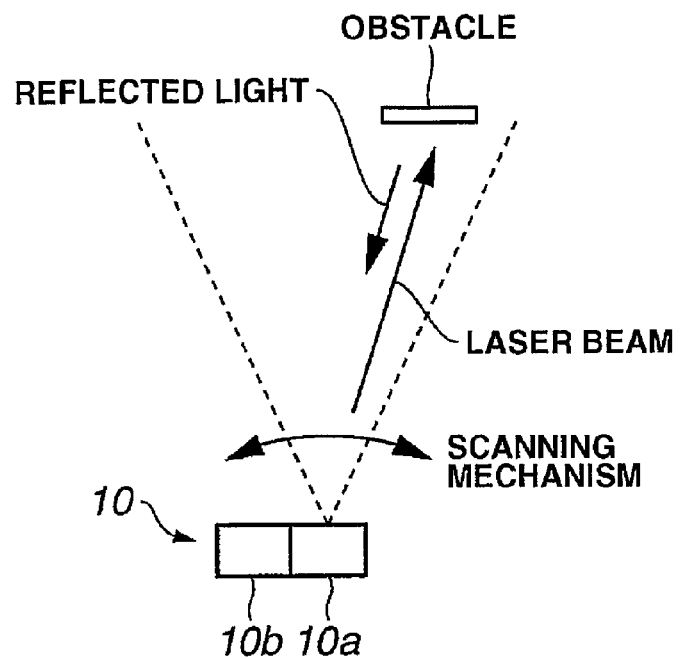
FIG. 2 is a schematic diagram illustrating the detection of an obstacle by radar.

This may be better understood by referring to the schematic diagram of FIG. 2. The radar 10 emits an infrared laser beam in a horizontal direction, scanning an area in front of the vehicle 1, and then detects an obstacle in front of the vehicle 1. The radar 10 includes a light-emitting section 10a, which emits a laser beam, and a light-receiving section 10b, which detects reflected light. The light-emitting section 10a is combined with a scanning mechanism and is configured to swing as shown by an arrow in FIG. 2. The light emitting section 10a sequentially emits light within a predetermined angle range. The radar 10 measures a distance from the vehicle 1 to the obstacle based upon a time difference between the laser beam emission by the light-emitting section 10a and receipt of a reflected beam by the light-receiving section 10b.

While scanning the area in front of the vehicle 1, the radar 10 measures a distance to an obstacle for each scanning position or scanning angle when the reflected light is received. The radar 10 also measures the lateral position of the obstacle relative to the vehicle 1 based upon the scanning angle when the obstacle is detected, and the distance to the obstacle. In other words, the radar 10 detects the presence of obstacle(s) and position of each obstacle relative to the vehicle 1.

Figure 3:
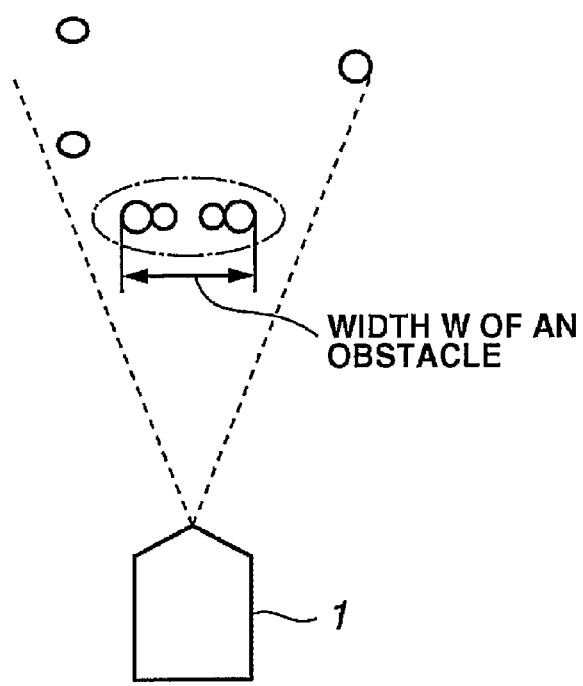
FIG. 3 is a schematic diagram of a scanning area in front of the vehicle.

FIG. 3 is a schematic diagram illustrating detecting of an obstacle by the radar 10. The position of the obstacle relative to the vehicle 1 is specified at each scanning angle, thus obtaining a plan view of the presence of obstacles within a scanning range by the radar 10.

An obstacle recognition device 40 receives information on the obstacle(s) in front of the vehicle 1 from the radar 10 and a vehicle speed sensor 20. Specifically, the obstacle recognition device 40 identifies movements of the detected obstacles based on detection results provided by the radar 10 in each scanning cycle or at each scanning angle. At the same time, the obstacle recognition device 40 determines whether or not the detected obstacles are the same obstacles or different obstacles based upon the closeness between the obstacles, similarities in movements of the obstacles, and the like.

Based on signals from the radar 10 and the vehicle speed sensor 20, the obstacle recognition device 40 recognizes spacing and relative speed between the vehicle 1 and the obstacle in front of the vehicle 1, a lateral distance from the vehicle 1 to the obstacle in front, and the width of the obstacle in front. If obstacles are in front of the vehicle 1, the obstacle recognition device 40 obtains information on each of the obstacles. The obstacle recognition device 40 provides, as output, the information on the obstacle(s) to a controller 50.

A steering angle sensor 30 is provided for a steering wheel. The steering angle sensor 30 detects an angular movement of a steering shaft as a steering angles and provides, as an output signal, the steering angles to the controller 50.

An accelerator pedal 61 is provided. An accelerator pedal stroke sensor is provided to detect a position of the accelerator pedal 61. A sensor signal of the accelerator pedal stroke sensor indicates the detected position and thus a driver power demand SA expressed via the accelerator pedal 61. The sensor signal indicative of the driver power demand SA is fed to the controller 50 and also to a driving force controller 60.

A brake pedal 91 is provided. A brake pedal stroke sensor is provided to detect a position of the brake pedal 91. A sensor signal of the brake pedal stroke sensor indicates the detected position and thus a driver brake demand SB expressed via the brake pedal 91. The sensor signal indicative of the driver brake demand SB is fed to a braking force controller 90 in the conventional manner for calculation of a brake control signal to a hydraulic brake system. The hydraulic brake system includes wheel brakes 95 (see FIG. 1).

The controller 50 may contain a microprocessor including as usual a central processing unit (CPU), and computer readable storage medium, such as a read only memory (ROM), a random access memory (RAM), etc.

With continuing reference to FIG. 1, the controller 50 provides a driving force correction amount ΔDa to the driving force controller 60 and a braking force correction amount ΔDb to the braking force controller 90.

Figure 4:
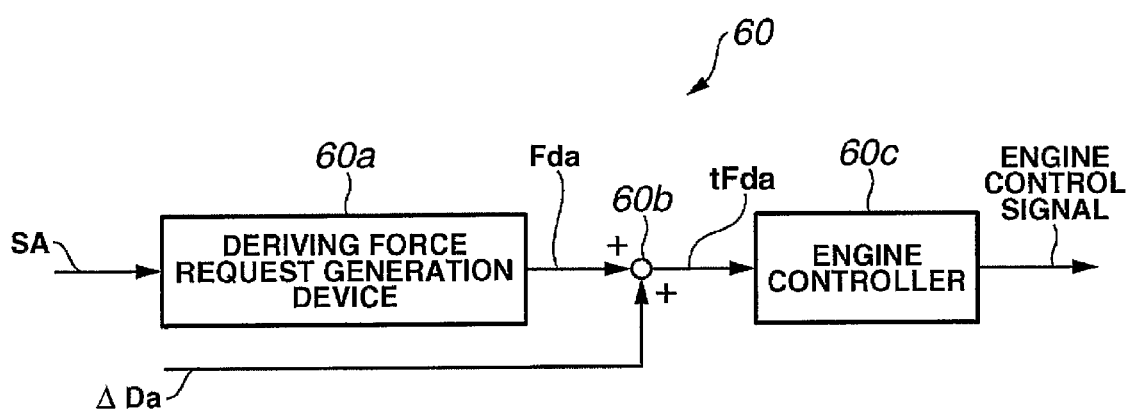
FIG. 4 is a block diagram of a driving force controller with a correction device indicated as a summation point.
Figure 5:
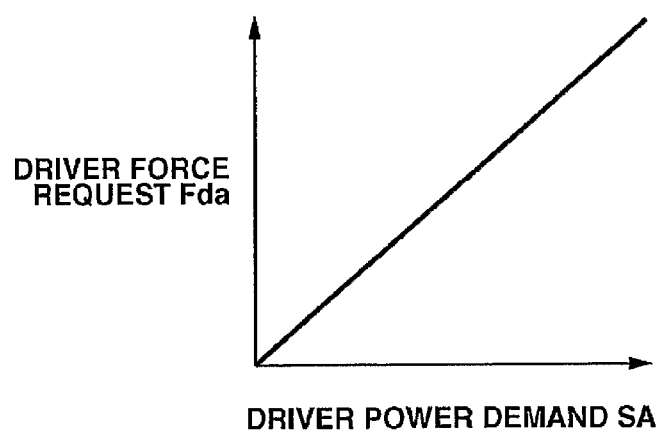
FIG. 5 shows a driving force request (Fda) versus driver power demand (SA, an accelerator pedal position) characteristic provided by a driving force request generation device of the driving force controller.

The block diagram of FIG. 4 illustrates the driving force controller 60 with a correction device 60b as indicated by a summation point. The driving force controller 60 includes a driving force request generation device 60a and an engine controller 60c. The driving force request generation device 60a receives the driver power demand SA and provides a driving force request Fda by data processing to realize the exemplary driving force request (Fda) versus driver power demand (SA) characteristic illustrated in FIG. 5. The driving force request Fda is fed to the correction device 60b. At the correction device 60b, the driving force request Fda is modified by the driving force correction amount ΔDa to provide the modified result as a target driving force tFda. In response to the target driving force tFda, the engine controller 60c provides an engine control signal applied to an engine to accomplish the corrected characteristic as illustrated by the fully drawn line in FIG. 16.

Figure 6:
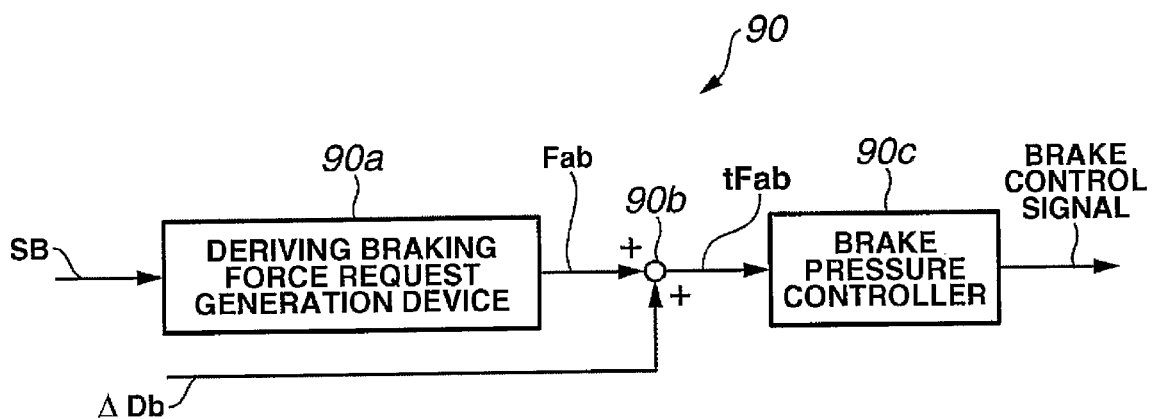
FIG. 6 is a block diagram of a braking force controller with a correction device indicated as a summation point.
Figure 7:
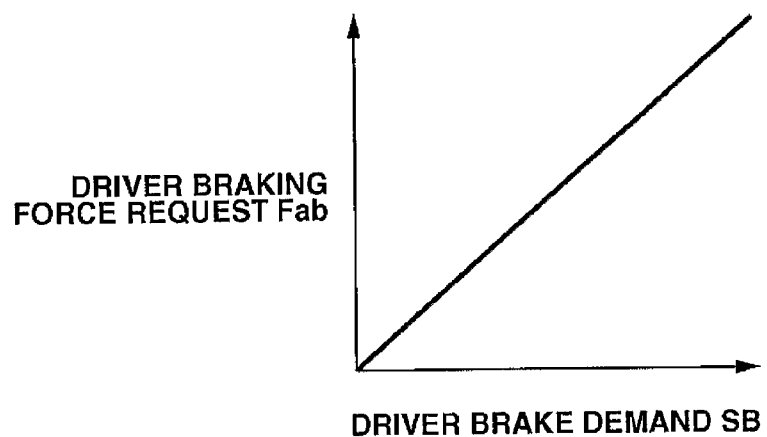
FIG. 7 shows a braking force request (Fdb) versus driver brake demand (SB, a brake pedal position) characteristic provided by a braking force request generation device of the braking force controller.

The block diagram of FIG. 6 illustrates the braking force controller 90 30 with a correction device 90b as indicated by a summation point. The braking force controller 90 includes a braking force request generation device 90a and a brake fluid pressure controller 90c. The braking force request generation device 90a receives the driver brake demand SB and provides a braking force request Fdb by data processing to realize the exemplary braking force request (Fdb) versus driver brake demand (SB) characteristic illustrated in FIG. 7. The braking force request Fdb is fed to the correction device 90b. At the correction device 90b, the braking force request Fdb is modified by the braking force correction amount ΔDb to provide the modified result as a target braking force tFdb. In response to the target braking force tFdb, the brake fluid pressure controller 90c determines a brake fluid pressure and provides a brake control signal applied to the hydraulic brake system to accomplish the corrected characteristic as illustrated by the fully drawn line in FIG. 16.

Figure 8:
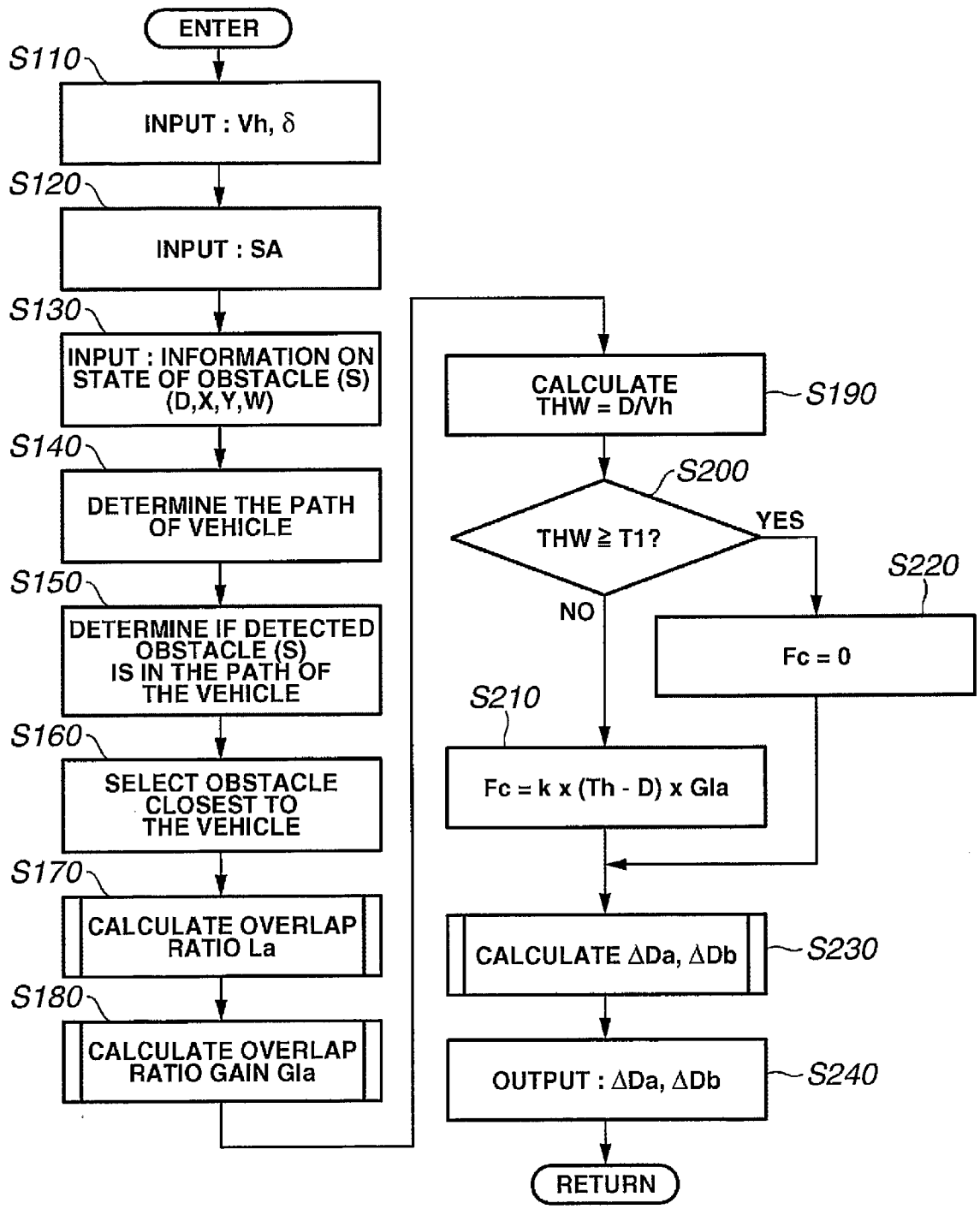
FIG. 8 is a flow chart of a main control routine illustrating the implementation of the operation of the embodiment shown in FIG. 1.

FIG. 8 is a flow chart of a main control routine illustrating the operation of the embodiment of the system according to the present invention. In the embodiment, the controller 50 repeats execution of the main control routine at regular intervals of, for example, 50 milliseconds.

In FIG. 8, at step S110, the controller 50 performs a reading operation of outputs of the vehicle speed sensor 20 and steering angle sensor 30 to receive, as inputs, a vehicle speed Vh and a steering angle δ.

At step S120, the controller 50 performs a reading operation of the output of an accelerator pedal stroke sensor for the accelerator pedal 61 to receive, as an input, driver power demand SA in the form of a position of the accelerator pedal 61.

At step S130, the controller 50 performs a reading operation of the output of the obstacle recognition device 40 to receive, as inputs, a lateral position, x, a longitudinal position, y, and a width W of each of the obstacles in front of the vehicle 1. The obstacle recognition device 40 determines the above-mentioned data (x, y, W) based on the outputs of the radar 10 and vehicle speed sensor 20.

At step S140, the controller 50 determines a traveling path of the vehicle 1 based on vehicle speed Vh and steering angle δ. The controller 50 determines a curvature ρ(1/m) of the traveling path of the vehicle 1 based on the vehicle speed Vh and steering angle δ. The curvature ρ may be expressed as:

$$\rho = 1/\{L(1 + A \cdot Vh^2)\} \times \delta/N \quad \text{(Equation 1)}$$

where: L is the length of a wheel base of the vehicle 1; A (a positive constant) is the stability factor for the vehicle 1; and N is a steering gear ratio of the vehicle 1.

The radius of curvature R may be expressed as:

$$R = 1/\rho \quad \text{(Equation 2)}$$

Figure 9:
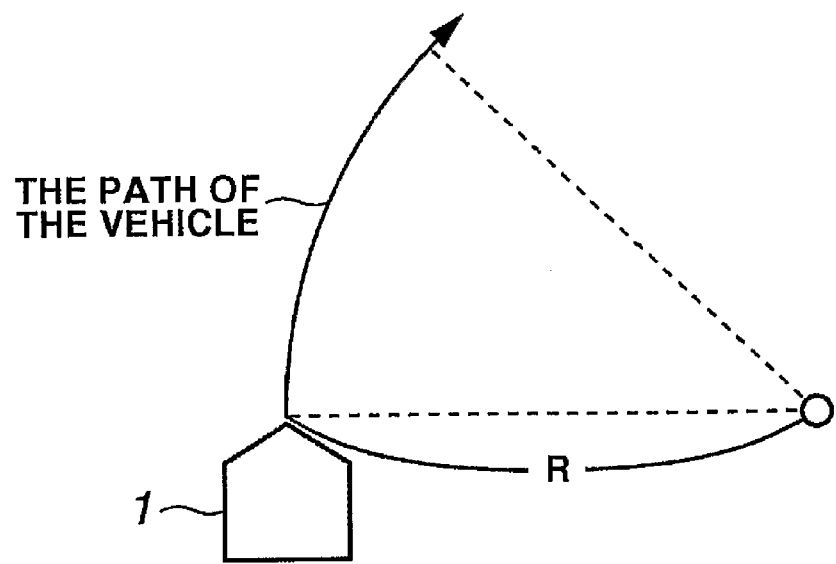
FIG. 9 is a schematic diagram of determining the centerline of the path of the vehicle.
Figure 10:
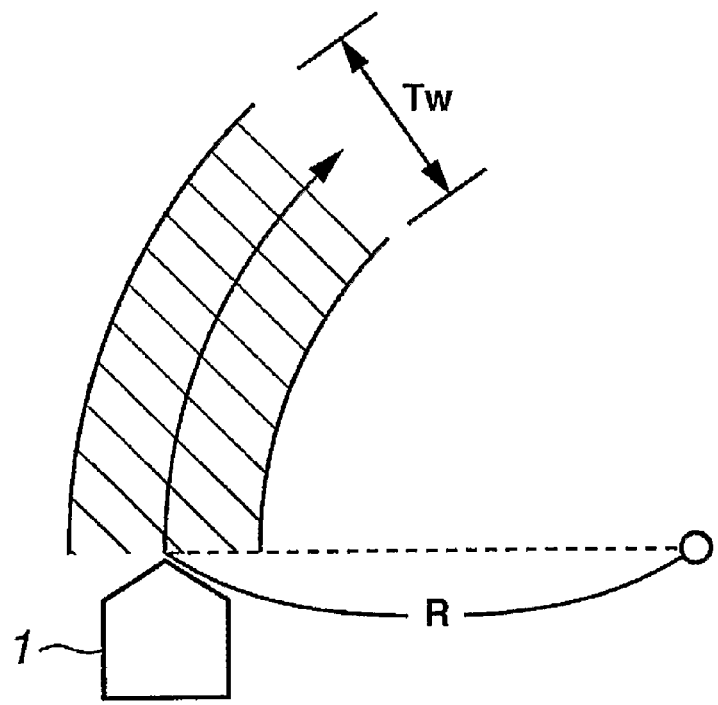
FIG. 10 is a schematic diagram of the path of the vehicle.

The controller 50 determines the radius of curvature R as shown in FIG. 9 and recognizes it as a centerline of an estimated traveling path in front of the vehicle 1 as shown in FIG. 10. The estimated traveling path recognized by the controller 50 is illustrated by the shadowed area in FIG. 10. The estimated traveling path has a width Tw. Accounting for a width of the vehicle 1 determines the width Tw. The width Tw may be a predetermined value or may vary with a change in the vehicle speed Vh.

At step S150, the controller 50 determines if one of the detected obstacle(s) is an obstacle in the path, which was determined at step S140, of the vehicle 1. Using the x-position, y-position and the width w, the controller 50 determines whether or not the detected obstacle is the obstacle in the path of the vehicle 1.

At step S160, the controller 50 selects the closest one of the obstacle(s) in the path of the vehicle 1 as a target obstacle in the path or an in-path target obstacle.

At step S170, the controller 50 calculates an overlap ratio La of the in-path target obstacle. The overlap ratio La represents the degree to which the in-path target obstacle and the path overlap with each other.

Figure 11:
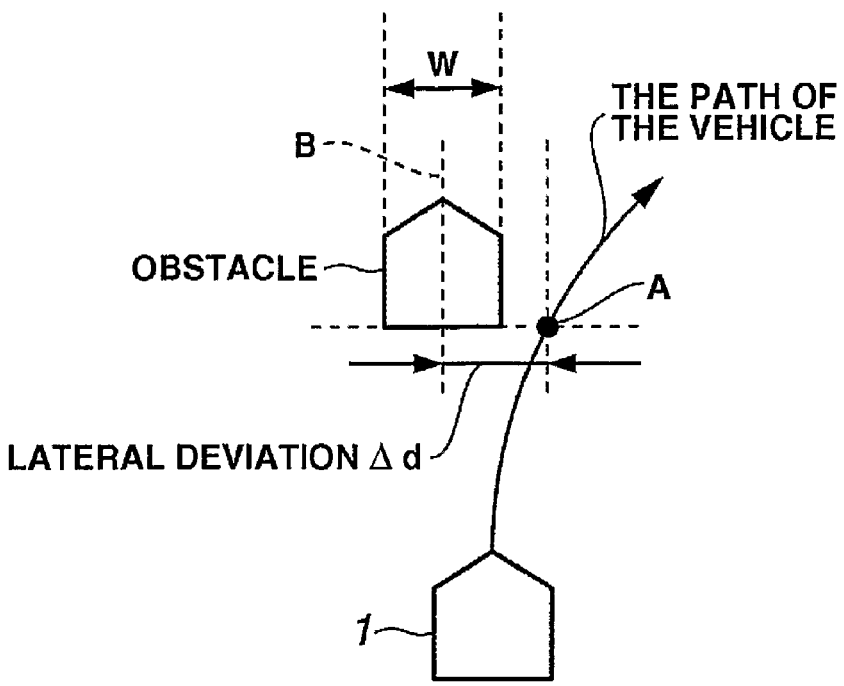
FIG. 11 is a schematic diagram illustrating how to measure a lateral distance of an in-path target obstacle.

The controller 50 measures a lateral deviation Δd between a longitudinal centerline of the in-path target obstacle and the centerline of the path of the vehicle 1. As shown in FIG. 11, the lateral deviation Δd includes a point A defined by an intersection of a line perpendicular to the longitudinal centerline of the in-path target obstacle and the centerline of the estimated path.

The lateral deviation Δd may be measured utilizing a conventional CCD camera.

Once the lateral deviation Δd is determined, the controller 50 proceeds to calculate the overlap ratio La, which may be expressed as:

$$La = 1 - \Delta d / W \quad \text{(Equation 3)}$$

With the same width W, the greater the overlap ratio La, the greater the degree to which the in-path target obstacle and the estimated path overlaps. The overlap ratio La accounts for the width W of the in-path target obstacle. With the same lateral deviation Δd, the greater the overlap ratio La, the greater the width of the in-path target obstacle.

Figure 12:
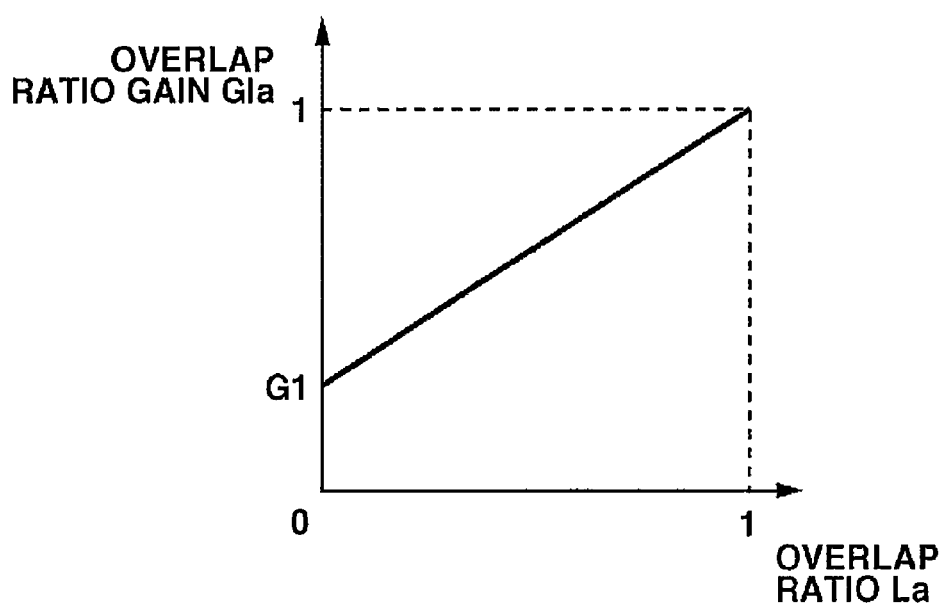
FIG. 12 is an overlap-ratio gain (Gla) versus overlap ratio (La) characteristic.

After determining the overlap ratio La, the control routine proceeds to step S180. At step S180, the controller 50 determines a gain, namely, an overlap-ratio gain Gla, based on the overlap ratio La. One example of the relationship between the overlap-ratio gain Gla and overlap ratio La is illustrated in FIG. 12. The overlap-ratio gain Gla is a predetermined value G1 lower than 1 and greater than 0 when the overlap ratio La is zero. The overlap-ratio gain Gla is 1 when the overlap ratio La is 1. The overlap-ratio gain Gla increases gradually from the predetermined value G1 to the maximum value of 1 as the overlap ratio La varies from 0 toward 1.

After determining the overlap-ratio gain Gla, the control routine proceeds to step S180. At step S190, the controller 50 calculates a time headway THW between the in-path target obstacle and the vehicle 1. As is well known to those skilled in the art, the time headway THW represents the elapse of time from the present moment to a future moment at which the vehicle 1 will reach the present position of the in-path target obstacle is. The time headway THW may be expressed as:

$$THW = D/Vh \quad \text{(Equation 4)}$$

The shorter the time headway THW, the greater the possibility that the vehicle 1 may come into contact with the in-path target obstacle. It may be said that the time headway THW represents a risk that the vehicle 1 may come into contact with the in-path target obstacle.

After determining the time headway THW, the routine proceeds to step S200. At step S200, the controller 50 determines whether or not the time headway THW is greater than or equal to a threshold value T1. If the headway time THW is less than the threshold value T1 and thus the possibility is high that the vehicle 1 may come into contact with the in-path target obstacle, the routine proceeds from step S200 to step S210 where the controller 50 determines a repulsive force Fc needed for calculating a driving force correction ΔDa and a braking force correction ΔDb. If the headway time THW is not less than the threshold value T1, the routine proceeds from step S200 to step S210 where the controller 50 sets the repulsive force Fc to 0 (zero).

Figure 13:
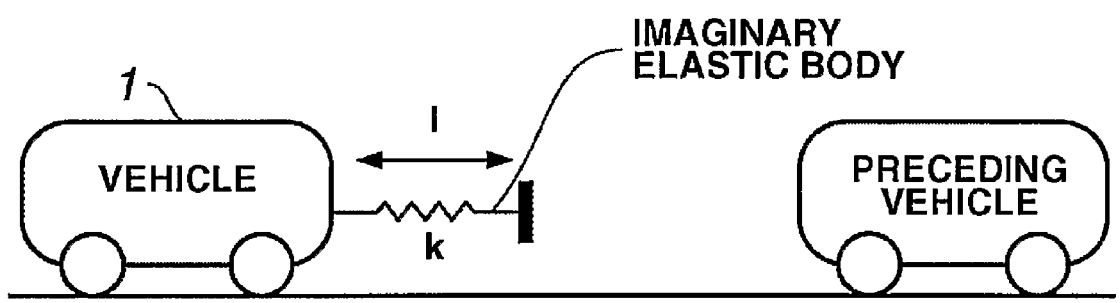
FIG. 13 is the state diagram of a vehicle traveling on a road with a preceding vehicle in front of the vehicle, illustrating the concept of an imaginary elastic body used for calculation of a risk (RP) derived from the preceding vehicle and a repulsive force (Fc).
Figure 14:
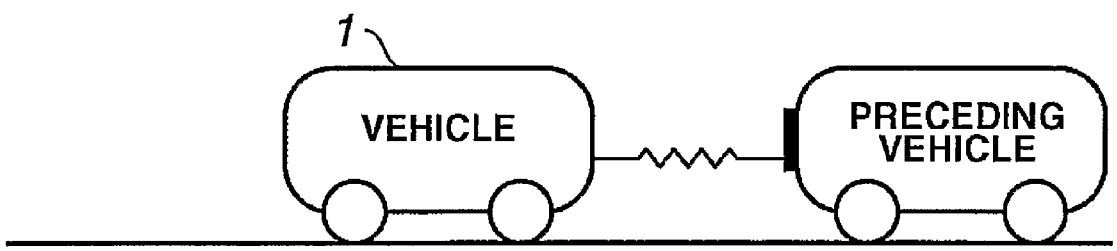
FIG. 14 is the state diagram of the vehicle having approached the preceding vehicle when the risk grows.

With reference to FIGS. 13 and 14, the manner of determining the repulsive force Fc is described. One may consider a model with an assumption that an imaginary elastic body is provided at the front of the vehicle 1. The imaginary elastic body is compressed between the in-path target obstacle and the vehicle 1 after they have come into contact with each other. A spring force C is applied to the vehicle 1 as the elastic body is compressed. This spring force C may be considered as a running resistance to the vehicle 1. In FIG. 13, the imaginary elastic body is illustrated as having an unstressed length of l (el) and a spring constant k. As the discussion proceeds, the unstressed length l (el) is given by a threshold value Th that may vary with different values of the vehicle speed Vh and different values of the threshold value Th1 for the time headway THW.

If, as shown in FIG. 13, the distance D between the vehicle 1 and the in-path target obstacle (in the form of the preceding vehicle) is longer than the unstressed length Th (or l, el), the imaginary elastic body is separated from the in-path target obstacle and no spring force is applied to the vehicle 1. Subsequently, the imaginary elastic body is compressed between the vehicle 1 and the in-path target obstacle as shown in FIG. 14 where the distance D is shorter than the unstressed length Th. Compressing the imaginary elastic body causes generation of the spring force C applied to the vehicle 1. The spring force C may be expressed as:

$$C = k \times (Th - D) \qquad \text{(Equation 5)}$$

where: k is the spring constant of the imaginary elastic body; Th is the unstressed length (l, el) of the imaginary elastic body; and D is the distance between the vehicle 1 and the in-path target obstacle.

The unstressed length Th may be appropriately set. For example, the unstressed length Th may be given by the product of Vh and Th1 (Vh, vehicle speed, Th1, threshold value for THW).

The spring force C is corrected to give a repulsive force Fc, which is appropriate for calculation of the driving force correction amount ΔDa and the braking force correction amount ΔDb. The repulsive force Fc may be expressed as:

$$Fc = k \times (Th - D) \times Gla \qquad \text{(Equation 6)}$$

where: Gla is the overlap-ratio gain.

The smaller the overlap ratio La, the smaller the repulsive force Fc is. The overlap ratio La becomes small as the lateral deviation Δd.

After determining the repulsive force Fc at step S210 or S220, the routine proceeds to step S230. At step S230, the controller 50 calculates the driving force correction amount ΔDa and the braking force correction amount ΔDb by executing a correction amount calculation sub-routine illustrated in FIG. 15.

Figure 15:
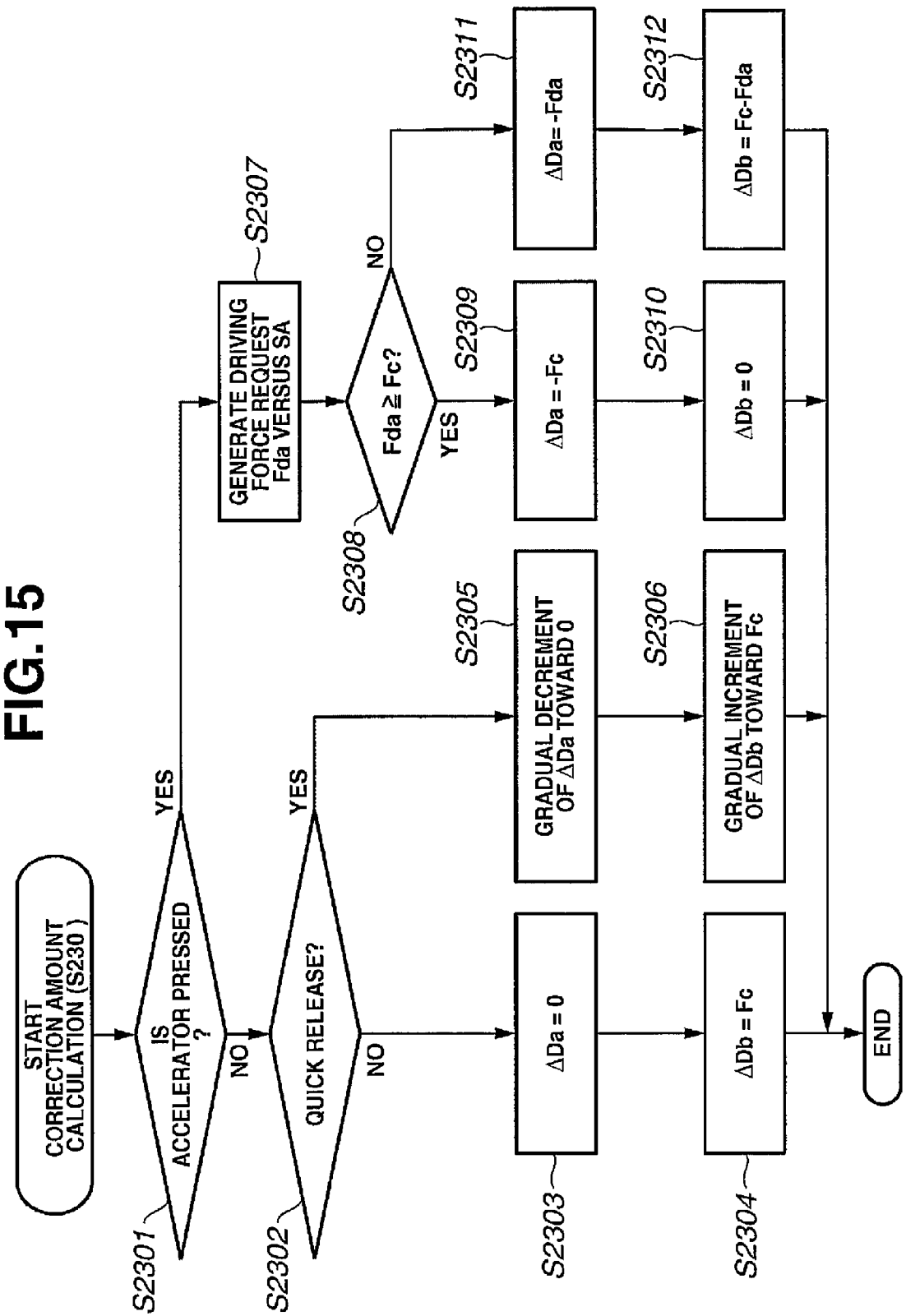
FIG. 15 is a flow chart of a "correction amount calculation" subroutine.

In FIG. 15, at step S2301, the controller 50 determines whether or not the accelerator pedal 61 is pressed from the driver power demand SA from the accelerator pedal stroke sensor. If the accelerator pedal 61 is not pressed, the routine proceeds to step S2302. At step S2302, the controller 50 determines whether or not the accelerator pedal 61 has been released quickly. This determination is made by comparing operation speed of the accelerator pedal 61 to a predetermined value. The operation speed may be calculated from a time rate of change in driver power demand SA. If, at step S2302, the controller 50 determines that the accelerator pedal 61 has been slowly released, the routine proceeds to step S2303. At step S2303, the controller 50 sets the driving force correction amount ΔDa to 0 (ΔDa=0). At the next step S2304, the controller 50 sets the braking force correction amount ΔDb to the repulsive force Fc.

If, at step S2302, the controller 50 determines that the accelerator pedal 62 has been quickly released, the routine proceeds to step S2305. At step S2305, the controller 50 carries out a decrement of the driving force correction amount ΔDa for gradual decrement of the driving force correction amount ΔDa toward 0. At the next step S2306, the controller 50 carries out an increment of the braking force correction amount ΔDb for gradual increment of the braking force correction amount ΔDb toward the repulsive force Fc.

If, at step S2301, the controller 50 determines that the accelerator pedal 61 is pressed, the routine proceeds to step S2307. At step S2307, the controller 50 determines a driving force request Fda versus driver power demand SA by using the relationship illustrated in FIG. 5 and generates the determined driving force request Fda.

At the next step S2308, the controller 50 determines whether or not the driving force request Fda is greater than or equal to the repulsive force Fc. If this is the case, the routine proceeds to step S2309. At step S2309, the controller 50 sets the driving force correction amount ΔDa to −Fc (ΔDa=−Fc). At the next step S2310, the controller 50 sets the braking force correction amount ΔDb to 0 (ΔDb=0). In this case, the driver feels acceleration less than expected because the driving force request Fda still remains after it has been reduced by Fc.

If, at step S2308, the controller 50 determines that the driving force request Fda is less than the repulsive force Fc, the routine proceeds to step S2311. At step S2311, the controller 50 sets the driving force correction amount ΔDa to −Fda (ΔDa=−Fda). At the next step S2312, the controller 50 sets the braking force correction amount ΔDb to a compensation (Fc−Fda) for a shortage in the driving force correction amount. In this case, the driver feels deceleration.

Figure 16:
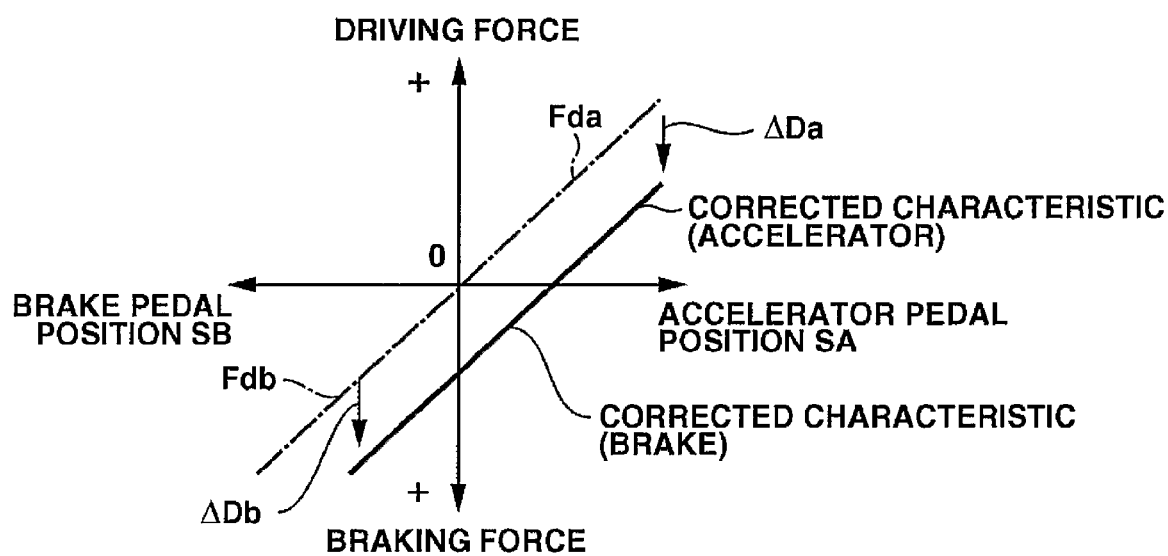
FIG. 16 shows, in the fully drawn lines, the corrected versions of the normal driving force request (Fda) versus accelerator pedal position (SA) characteristic and the normal braking force request (Fdb) versus brake pedal position (SB), respectively, shown, in the one-dot chain line.

FIG. 16 illustrates the manner of correcting driving force and braking force. In FIG. 16, the horizontal axis represents the accelerator pedal position or driver power demand SA and the brake pedal position or driver brake demand SB. The driver power demand SA increases from the origin 0 in a right-hand direction. The driver brake demand SB increases from the origin 0 in a left-hand direction. The vertical axis represents the driving force and the braking force. The driving force increases from the origin 0 in an upward direction. The braking force increases from the origin 0 in a downward direction.

In FIG. 16, the one-dot chain line indicates varying of driving force request Fda with different values of accelerator pedal position SA and varying of braking force request Fdb with different values of brake pedal position SB. The fully drawn line indicates varying of driving and braking force requests as corrected by the correction amounts ΔDa and ΔDb.

When the driving force request Fda is greater than the repulsive force indicative final variable Fc, the driving force request Fda is decreased simply by the driving force correction amount ΔDa (=−Fc).

When the driving force request Fda is less than the final variable Fc, the driving force request Fda is decreased by the driving force correction amount ΔDa (=−Fda), leaving no driving force request. The braking force correction amount ΔDb is set to a difference between the final variable Fc and the driving force request Fda. In this case, the driver feels less rapid deceleration corresponding to restrained driver power demand SA.

Turning back to FIG. 8, after calculating the driving force and braking force correction amounts ΔDa and ΔDb at step S230, the routine proceeds to step S240.

At step S240, the controller 50 provides the driving force correction amount ΔDa and braking force correction amount ΔDb to the driving force controller 60 and braking force controller 90, respectively. The driving force controller 60 calculates a target driving force based on the driving force correction amount ΔDa and the driving force request Fda, and controls the engine to generate the target driving force. The braking force controller 90 calculates a target braking force based on the braking force correction amount ΔDb and driving force request Fdb, and controls a hydraulic brake fluid pressure to generate the target braking force.

The embodiment may be appreciated from the several sections below.

(1) The controller 50 determines risk regarding the possibility that the vehicle 1 may come into contact with the in-path target obstacle. The controller 50 regulates the driving force and braking force applied to the vehicle 1 in response to the risk. The controller 50 determines the gain Gla based on the width of an in-path target obstacle. The controller 50 determines a repulsive force Fc by multiplying the gain with a force C applied to the vehicle 1 by the imaginary elastic body compressed between the vehicle 1 and the in-path target obstacle. Based on the repulsive force Fc, the controller 50 determines the driving force correction amount ΔDa and the braking force correction amount ΔDb. Using these correction amounts ΔDa and ΔDb, the driving force and braking force are controlled. If, for example, the vehicle 1 approaches the in-path target obstacle for overtaking same, the driving force and braking force change, taking the width of the in-path target obstacle into account. This change does not produce any input unacceptable to the driver.

(2) The smaller the width W of the in-path target obstacle, the smaller the repulsive force Fc. With the same lateral deviation Δd, the smaller the width W of the in-path target obstacle, the smaller is the overlap ratio La (see Equation 3). Thus, the smaller the width W of the in-path target obstacle, the smaller is the overlap-ratio Gla. As a result, the repulsive force Fc becomes small as the width W becomes small. Hence, the driving force is less restrained during approach to the in-path target obstacle having a small width W, allowing quick operation to acceleration for overtaking the in-path target obstacle. The vehicle 1 can be prevented from approaching excessively the in-path target obstacle having a large width W by subjecting the vehicle 1 to deceleration.

(3) The controller 50 determines the overlap ratio La that is variable with the lateral deviation Δd and width W of the in-path target obstacle, and determines the repulsive force Fc based on the overlap ratio La. The driving force and braking force change in accordance with the overlap ratio La, producing no input that is unacceptable to the driver.

(4) As shown in FIG. 12, the overlap-ratio gain (control gain) Gla gradually increases from the predetermined value as the overlap ratio La increases from 0 (zero). Because the overlap-ratio gain Gla will not drop below the predetermined value even if the overlap-ratio La is near or 0, a change in the driving force and/or braking force based on the risk regarding the possibility that the vehicle 1 may come into contact with the in-path target obstacle remains, making it possible to transmit the risk to the driver.

Figure 17:
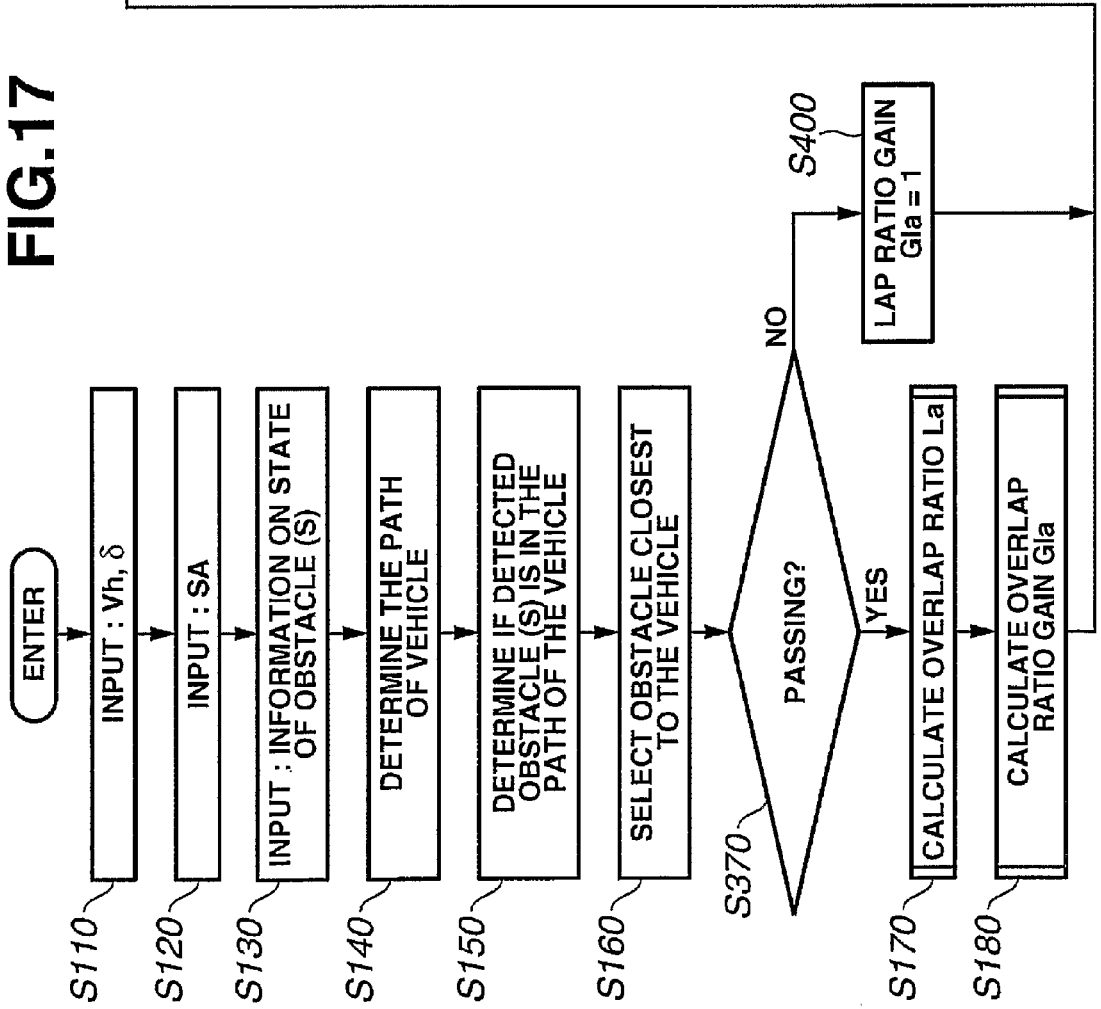
FIG. 17 is a flow chart, similar to FIG. 8, of a modified main control routine.

With reference now to FIG. 17, another embodiment according to the present invention is described.

This embodiment is substantially the same as the preceding embodiment illustrated in FIGS. 1 to 16. However, this embodiment is different from the preceding embodiment in that a change in driving force and/or braking force in response to an overlap ratio La takes place only when a vehicle 1 overtakes or passes an in-path target obstacle.

The flow chart of FIG. 17 illustrates operation of this embodiment. This flow chart is substantially the same as the flow chart of FIG. 8 so that like reference numerals are used to designate like steps throughout FIGS. 8 and 17. However, the flow chart of FIG. 17 is different from the flow chart of FIG. 8 in that an interrogation step S370 is provided between the steps S160 and S170 and a new step S400 is provided in a flow bypassing the steps S170 and S180.

In FIG. 17, at step S370, the controller 50 determines whether or not the vehicle 1 is carrying out an operation to overtake or pass an in-path target obstacle by monitoring the status of at least one of driver controlled input devices including an accelerator pedal 61, a turn indicator, and a steering wheel. Specifically, it may be determined that the vehicle 1 is carrying out an operation to overtake or pass the in-path target obstacle when the driver has stepped on the accelerator pedal 61 or the driver has operated the turn indicator or the driver has turned the steering wheel beyond a predetermined angle upon detection of the in-path target obstacle. Once the controller 50 has determined that the vehicle 1 is carrying out an operation to overtake or pass the in-path target obstacle, the routine proceeds to step S170, and then to step S180.

At step 170, the controller 50 determines an overlap ratio La expressed by equation 3. At the next step S180, the controller 50 determines an overlap-ratio gain Gla using the illustrated relationship in FIG. 12.

If the controller 50 determines that the vehicle 1 is not carrying out an operation to overtake the in-path target obstacle, the routine proceeds from step S370 to step S400. At step S400, the controller 50 sets the overlap-ratio gain Gla to 1 (one).

After determining the overlap-ratio gain Gla at step S180 or S400, the routine proceeds to step S190.

This embodiment is advantageous in that the repulsive force Fc is corrected with the width W of the in-path target obstacle when the vehicle overtakes or passes the in-path target obstacle, but it is not corrected when the vehicle is just following the in-path target obstacle. When the vehicle 1 overtakes or passes the in-path target obstacle, a change in driving force and/or braking force depending on the width W is acceptable to the driver. As there occurs no change in driving force and/or braking force with different values in the width W of the in-path target obstacle, enhanced ride comfort is provided when the vehicle 1 is following the in-path target obstacle.

With reference now to FIGS. 18 to 21, another embodiment according to the present invention is described. This embodiment is substantially the same as the before described embodiment illustrated in FIGS. 1 to 16 so that like reference numerals are used to designate like parts or portions throughout each of FIGS. 1, 8, 18 and 19. However, this embodiment is different from the previously described embodiment in that a repulsive force Fc is transmitted to a driver of a vehicle 3 via a haptic input in the form of reaction force from a driver controlled input device such as, for example, an accelerator pedal 61 and a brake pedal 91.

Figure 18:
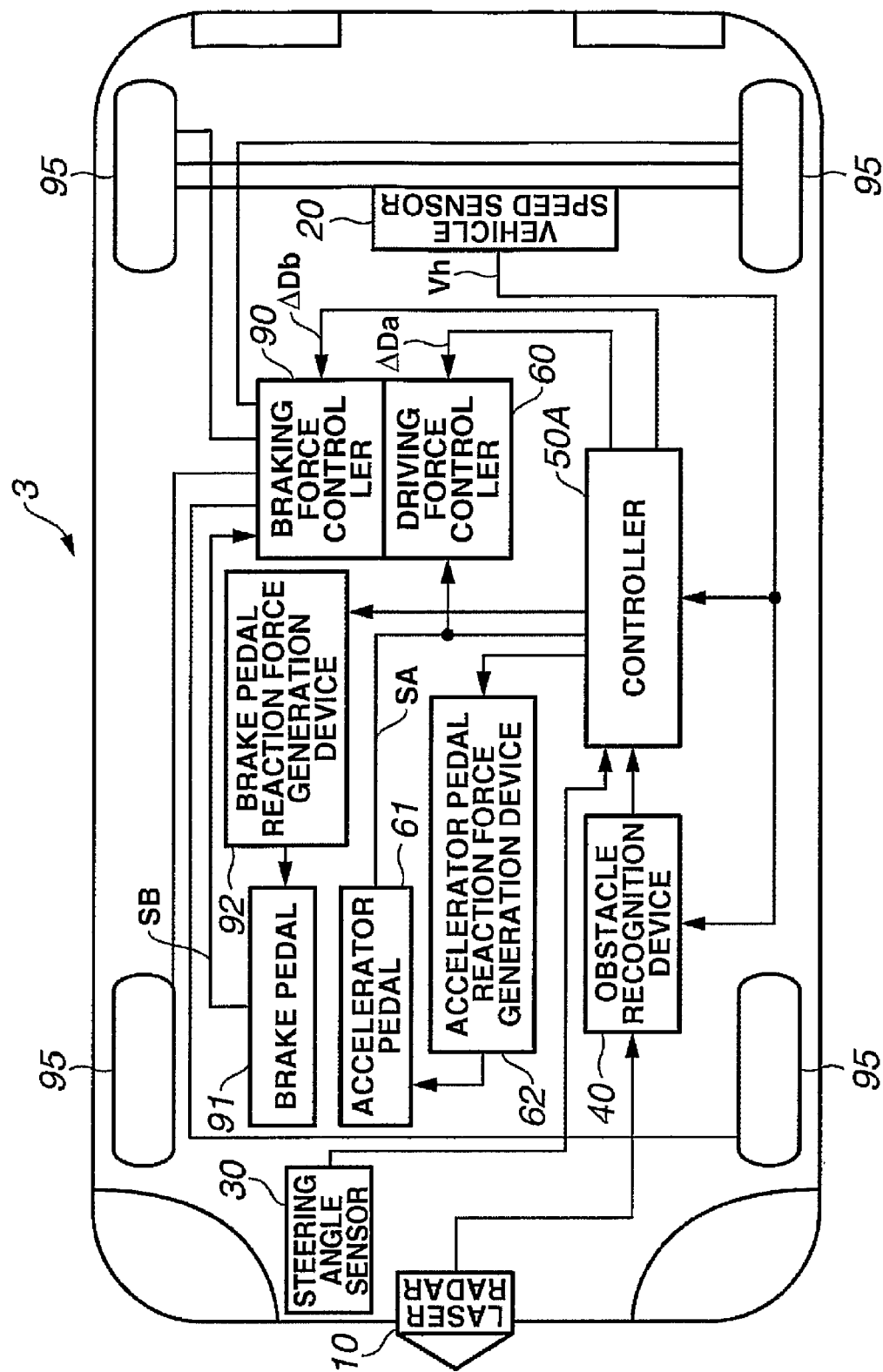
FIG. 18 is a block diagram, similar to FIG. 1, of another embodiment of the system according to the present invention.

As shown in FIG. 18, an accelerator pedal reaction force generation device 62 and a brake pedal reaction force generation device 92 are additionally provided. According to this embodiment, the reaction force from the accelerator pedal 61 and that from the brake pedal 91 are regulated in accordance with a repulsive force Fc that is variable with an overlap-ratio gain Gla.

The accelerator pedal reaction force generation device 62 includes a servomotor incorporated in a link mechanism of the accelerator pedal 61. The accelerator pedal reaction force generation device 62 receives a command FA from a controller 50A. The command FA indicates an accelerator pedal reaction force value determined by the controller 50A. In response to the command FA, the accelerator pedal reaction force generation device 62 regulates operation of the servomotor to adjust torque generated by the servomotor. Thus, the accelerator pedal reaction force generation device 62 can arbitrarily control reaction force when the driver steps on the accelerator pedal 61. The accelerator pedal reaction force is proportional to the driver power demand SA when the reaction force control is not carried out.

For understanding of the accelerator pedal of the above kind, reference should be made to US 2003/0236608 A1 (published Dec. 25, 2003) and also to US 2003/0233902 A1 (published Dec. 25, 2003), both of which have been hereby incorporated by reference in their entireties.

The brake pedal reaction force generation device 92 includes a servomotor incorporated in a link mechanism of the brake pedal 91. The brake pedal reaction force generation device 92 receives a command FB from the controller 50A. The command FB indicates a brake pedal reaction force value determined by the controller 50A. In response to the command FB, the brake pedal reaction force generation device 92 regulates operation of the servomotor to adjust torque generated by the servomotor. Thus, the brake pedal reaction force generation device 92 can arbitrarily control reaction force when the driver steps on the brake pedal 91. The brake pedal reaction force is proportional to the driver brake demand SB when the reaction force control is not carried out.

Figure 19:
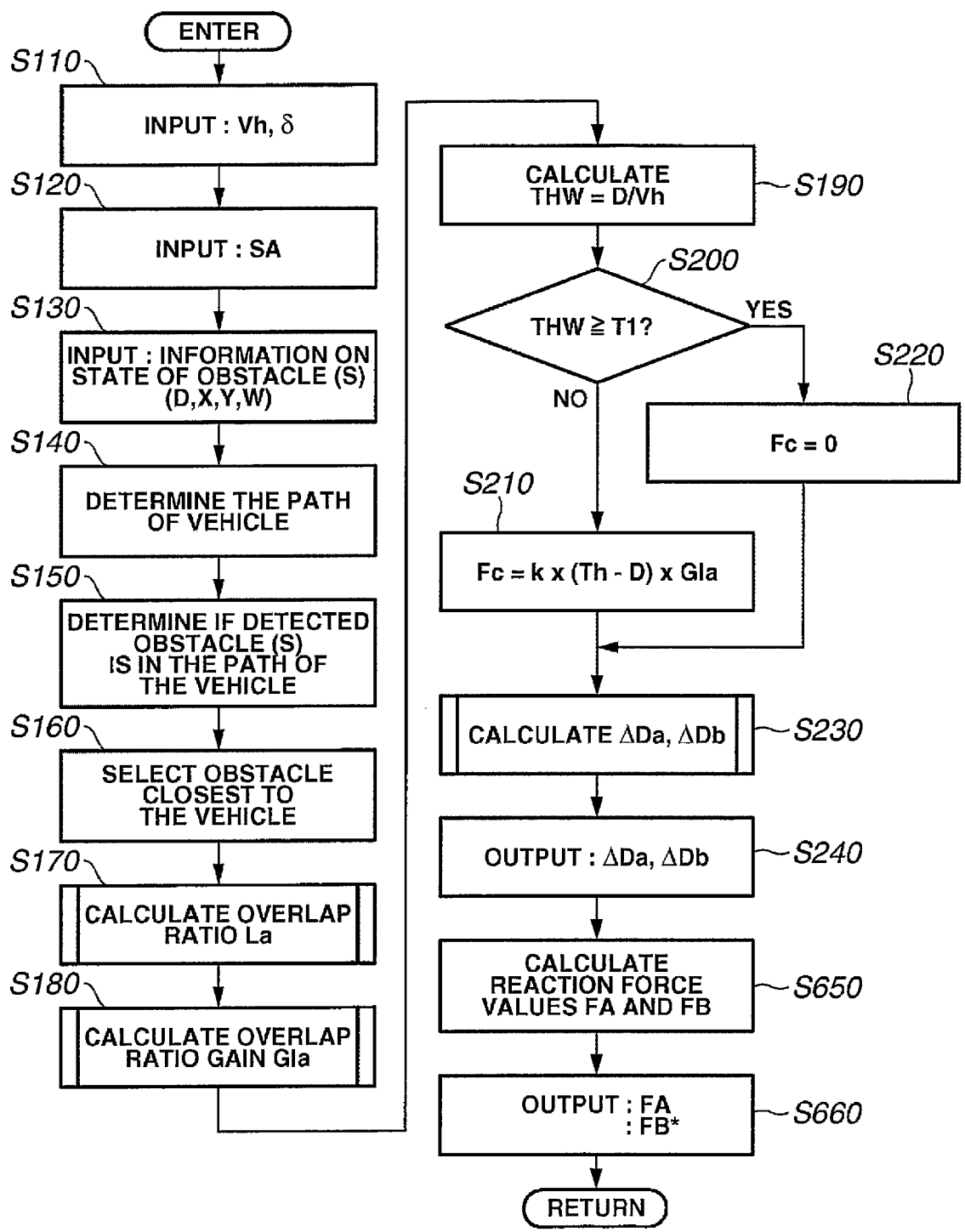
FIG. 19 is a flow chart, similar to FIG. 8, of a main control routine illustrating the operation of the embodiment shown in FIG. 18.

The flow chart of FIG. 19 illustrates operation of this embodiment. This flow chart is substantially the same as the flow chart of FIG. 8 so that like reference numerals are used to designate like steps throughout FIGS. 8 and 19. However, the flow chart of FIG., 19 is different from the flow chart of FIG., 8 in that new steps S650 and S660 are additionally provided.

In FIG. 19, at step S650, the controller 50A calculates the accelerator pedal reaction force value FA and brake pedal reaction force value FB. In the embodiment, a repulsive force Fc determined at step S210 or S220 is used for the calculation. The controller 50A determines the accelerator pedal reaction force value FA versus the repulsive force Fc to accomplish the fully drawn relationship in FIG. 20. The controller 50A determines the brake pedal reaction force value FB versus the repulsive force Fc to accomplish the fully drawn relationship in FIG. 21.

Figure 20:
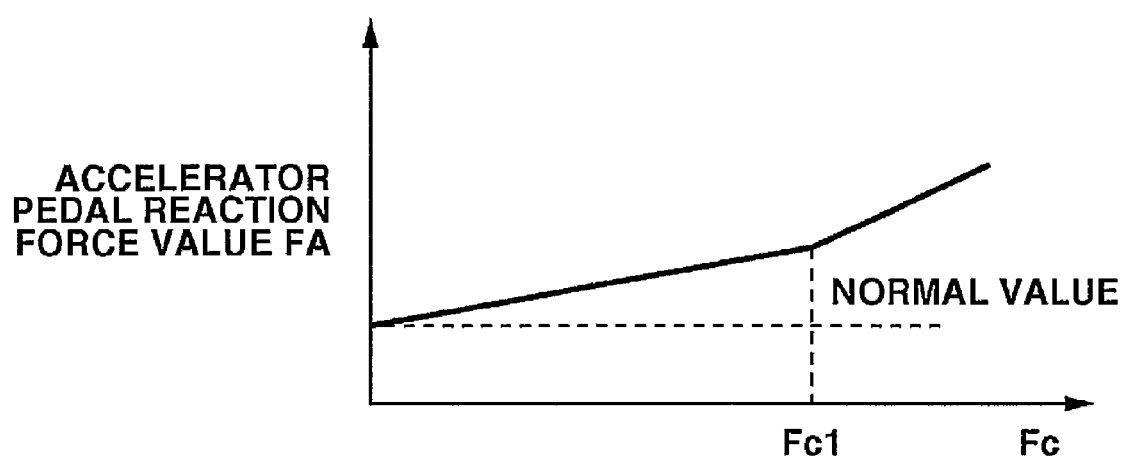
FIG. 20 shows varying of accelerator pedal reaction force value (FA) with different values of repulsive force (Fc).
Figure 21:
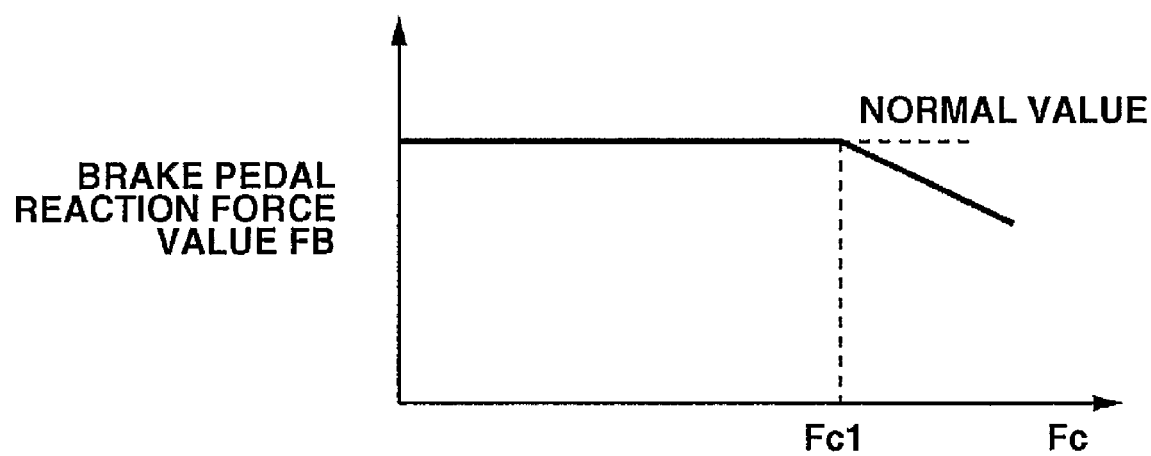
FIG. 21 shows varying of brake pedal reaction force value (FB) with different values of repulsive force (Fc).

In FIG. 20, the fully drawn line shows varying of the accelerator pedal reaction force value FA with different values of the repulsive force Fc when the driver power demand SA (accelerator pedal position) is kept constant. The broken line shows a normal value of the accelerator pedal reaction force when the accelerator pedal reaction force is not controlled. The normal value is invariable with different values of the repulsive force Fc. The accelerator pedal reaction force value FA is equal to the normal value when the repulsive force Fc is 0 (Fc=0). As the repulsive force Fc increases from 0, the accelerator pedal reaction force value FA increases at a gradual rate as deviated upwardly from the normal value. A new increased rate is introduced. Upon or immediately after the repulsive force Fc has exceeded a predetermined value Fc1, the accelerator pedal reaction force value FA increases at the new increased rate. This means that the reaction force from the accelerator pedal 61 increases as the driving force correction amount ($\Delta Da$) increases.

In FIG. 20, the fully drawn line shows varying of the brake pedal reaction force value FB with different values of the repulsive force Fc when the driver brake demand SB (brake pedal position) is kept constant. The broken line shows a normal value of the brake pedal reaction force when the brake pedal reaction force is not controlled. The normal value is invariable with different values of the repulsive force Fc. The brake pedal reaction force value FB remains on the normal value as the repulsive force Fc increases from 0. Upon or immediately after the repulsive force Fc has exceeded the predetermined value Fc1, the accelerator pedal reaction force value FB drops. This means that the reaction force from the brake pedal 91 becomes small as the braking force correction amount ($\Delta Db$) increases, allowing an assist for braking operation to increase, making it easy for the driver to step on the brake pedal 91.

After determining the accelerator pedal reaction force value FA and the brake pedal reaction force value FB at step S650, the routine proceeds to step S660.

At step S660, the controller 50A provides the accelerator pedal reaction force value FA and the brake pedal reaction force value FB to the accelerator pedal reaction force generation device 62 and the brake pedal reaction force generation device 92, respectively (see FIG. 18). The accelerator pedal reaction force generation device 62 regulates a reaction force from the accelerator pedal 61 in accordance with the reaction force value FA. The brake pedal reaction force generation device 92 regulates a reaction force from the brake pedal 91 in accordance with the reaction value FB.

This embodiment is advantageous in that the braking force correction amount and braking force correction amount are transmitted to the driver via a reaction force input from the accelerator pedal 61 and a reaction force input from the brake pedal 91. If the width W of an in-path target obstacle is small, the reaction force from the accelerator pedal 91 becomes small, allowing quick shift to subsequent acceleration for overtaking the in-path target obstacle. In this embodiment, the accelerator pedal 61 and brake pedal 91 are selected as driver controlled input devices for longitudinal control of the vehicle.

Figure 22:
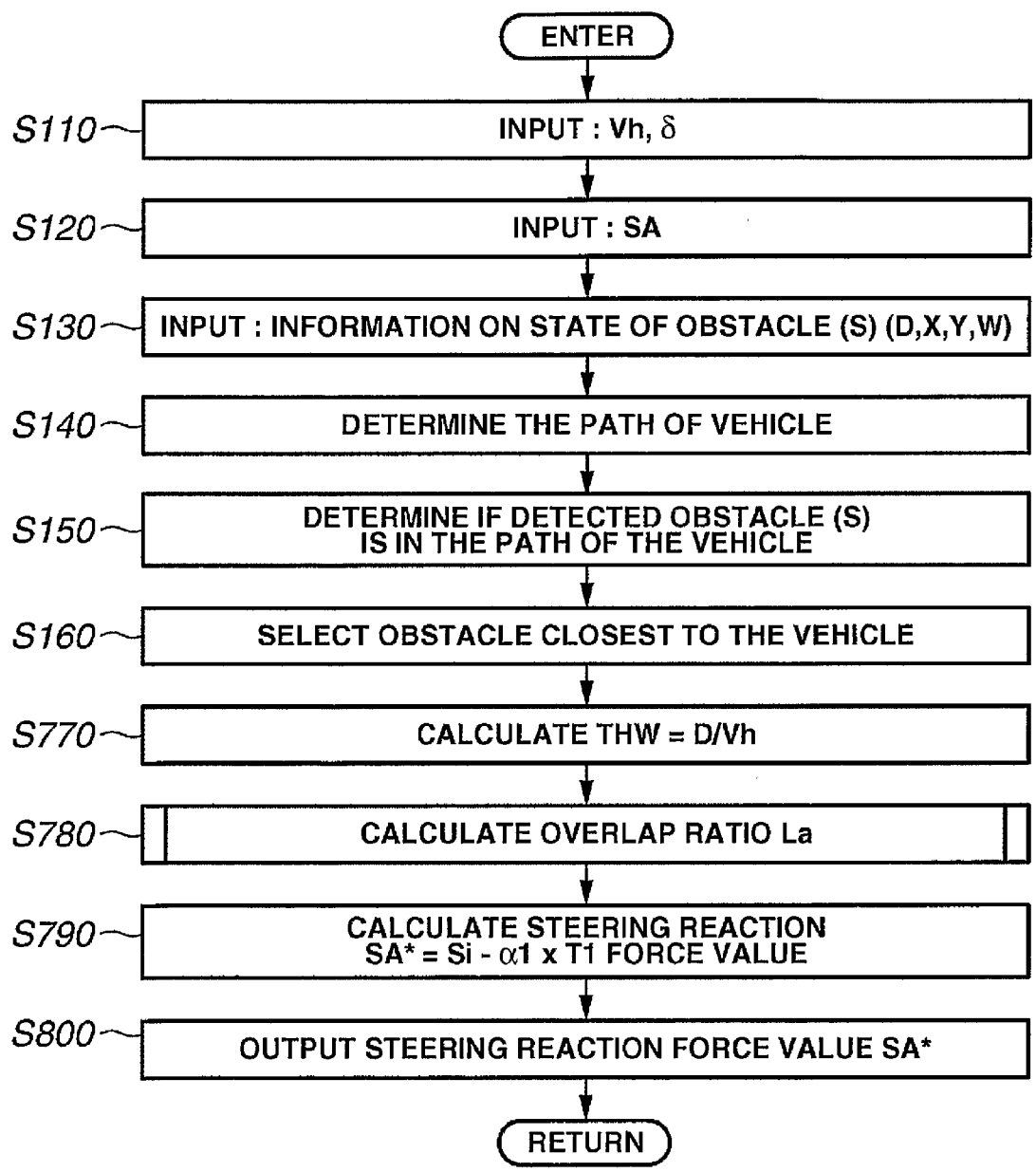
FIG. 22 is a flow chart of a control routine illustrating operation of the method according to the present invention.
Figure 23:
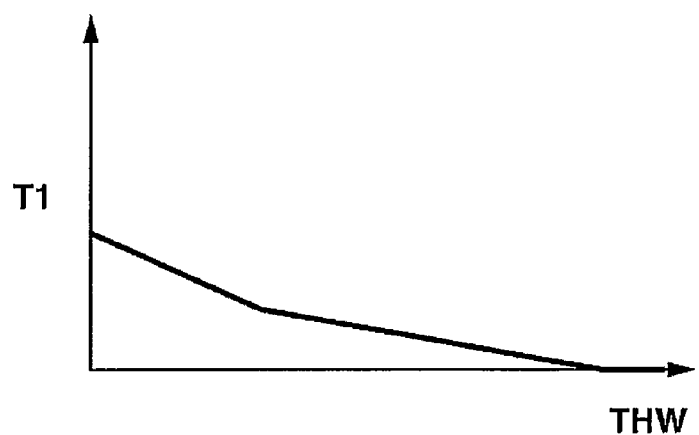
FIG. 23 shows varying of steering reaction force reduction amount (T1) with different values of time headway (THW).
Figure 24:
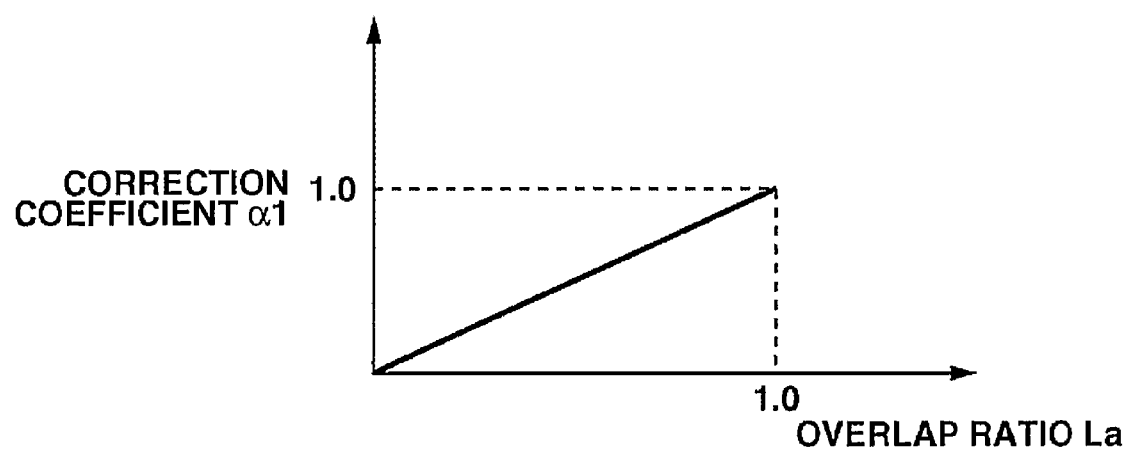
FIG. 24 shows varying of correction coefficient ($\alpha 1$) with different values of overlap ratio (La).

With reference now to FIGS. 22 to 24, another embodiment according to the present invention is described. This embodiment is substantially the same as the above described embodiment illustrated in FIGS. 18 to 21 so that like reference numerals are used to designate like parts or portions throughout each of FIGS. 19 and 22. However, this embodiment is different from the above described embodiment in that, in this embodiment, a reaction force from a driver controlled input device for lateral control of a vehicle is regulated, while, in the above described embodiment, a reaction force from driver controlled input device(s) for longitudinal control of a vehicle is regulated.

The flow chart of FIG. 22 illustrates a method according to the present invention. This flow chart and the flow chart of FIG. 19 are substantially the same in that both have steps S110, S120, S130, S140, S150 and S160. For brevity, description on these steps has been hereby omitted.

In FIG. 22, the method proceeds from step S160 to step S770 to calculate or determine a time headway THW as expressed by the equation 4.

After determining the time headway THW, the method proceeds to step S780 to calculate or determine an overlap ratio La as expressed by the equation 3.

After determining the overlap ratio La at step S780, the method proceeds to step S790 to calculate or determine a steering reaction force value SA*. Specifically, the method proceeds to determine a steering reaction force reduction amount T1 versus the time headway THW using a relationship between them as illustrated in FIG. 23. As indicated by the illustrated relationship, the steering reaction force reduction amount T1 increases as the time headway THW becomes short to represent that the vehicle has approached the in-path target obstacle. Increasing the steering reaction force reduction amount T1 encourages the driver to start lane-change operation.

After determining the steering reaction force reduction amount T1, the method proceeds to correct the steering reaction force reduction amount T1 in accordance with the overlap ratio La. Specifically, the method proceeds to determine a correction coefficient, $\alpha 1$, versus the overlap ratio La using a relationship between them as illustrated in FIG. 24. As indicated by the illustrated relationship, the correction coefficient, $\alpha 1$, increases gradually from 0 to 1 as the overlap ratio La increases from 0 to 1.

After determining the correction coefficient α1, the method proceeds to determine the steering reaction force value SA*, which is expressed as:

$$SA^* = Si - \alpha 1 \times Ti \quad \text{(Equation 7)}$$

where: Si represents an initial steering reaction force value.

After determining the steering reaction force value SA*, the method proceeds to step S800 to provide, as an output, the determined SA*. In response to the steering reaction force value SA*, a steering reaction force generation device regulates a steering reaction force from a steering wheel.

If the time headway THW becomes short, it may be predicted that the vehicle is about to overtake the in-path target obstacle. The driver is encouraged to manipulate a steering wheel by reducing the steering reaction force. The larger the width of the in-path target obstacle, the more the steering reaction force reduction amount T1 is increased to facilitate the manipulation of the steering further. Specifically, as the overlap ratio La increases, the correction coefficient α1 gradually increases from 0 to 1. If, for example, the in-path target obstacle is directly in front of the vehicle and the overlap ratio La is 1, the steering reaction force value SA* is given by reflecting the entirety (100%) of the steering reaction force reduction amount T1 that has been determined versus the current time headway THW because it is unmodified. Subsequently, as the vehicle begins to overtake the in-path target obstacle, the overlap ratio La decreases from 1. Thus, the steering reaction force value SA* reflects less the steering reaction force reduction amount T1 because it is modified by the correction coefficient α1 less than 1. Varying of the steering reaction force value SA* in this manner is free from providing an input unacceptable by the driver.

In this embodiment, the steering wheel was exemplified as a driver controlled input device for lateral control of the vehicle. This steering reaction force control may combine with the braking/driving force control described in the preceding embodiments.

Figure 25:
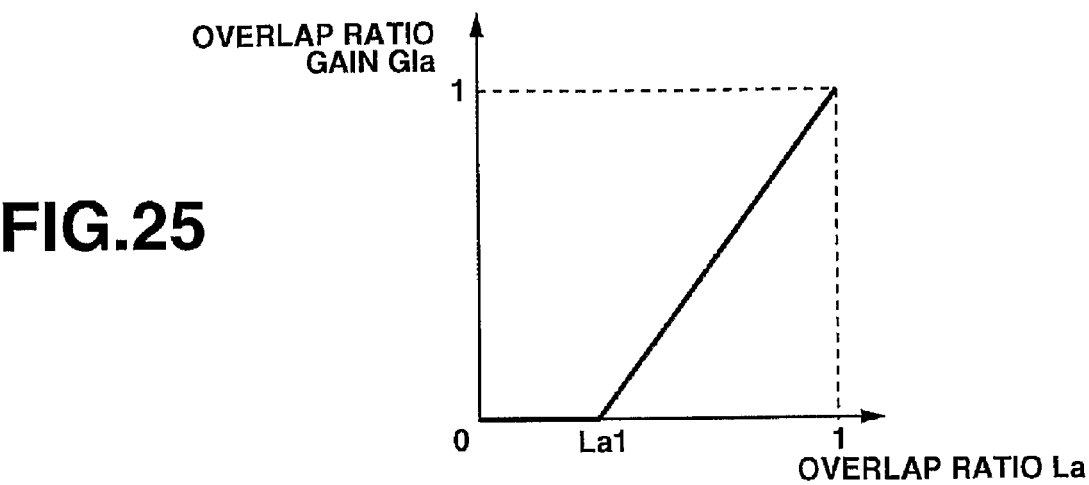
FIG. 25 is another form of an overlap-ratio gain (Gla) versus overlap ratio (La) characteristic.
Figure 26:
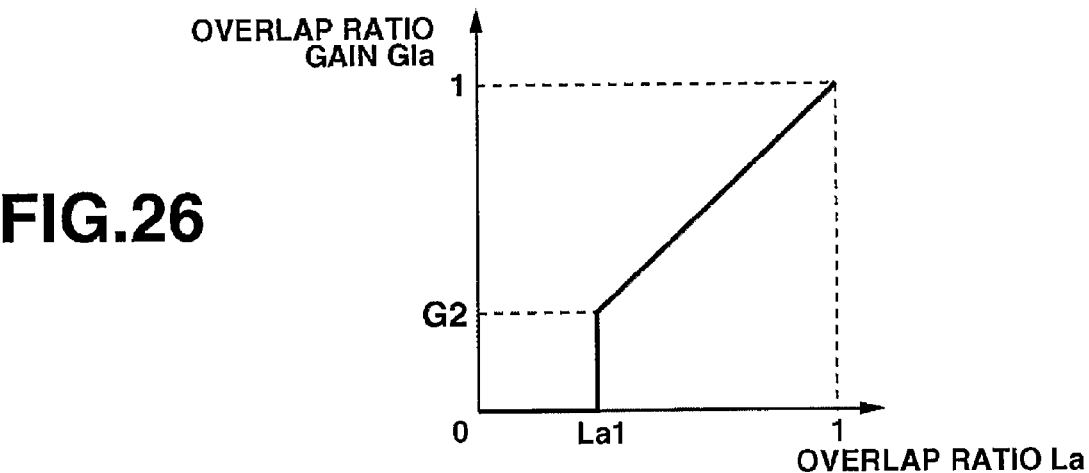
FIG. 26 is another form of an overlap-ratio gain (Gla) versus overlap ratio (La) characteristic.
Figure 27:
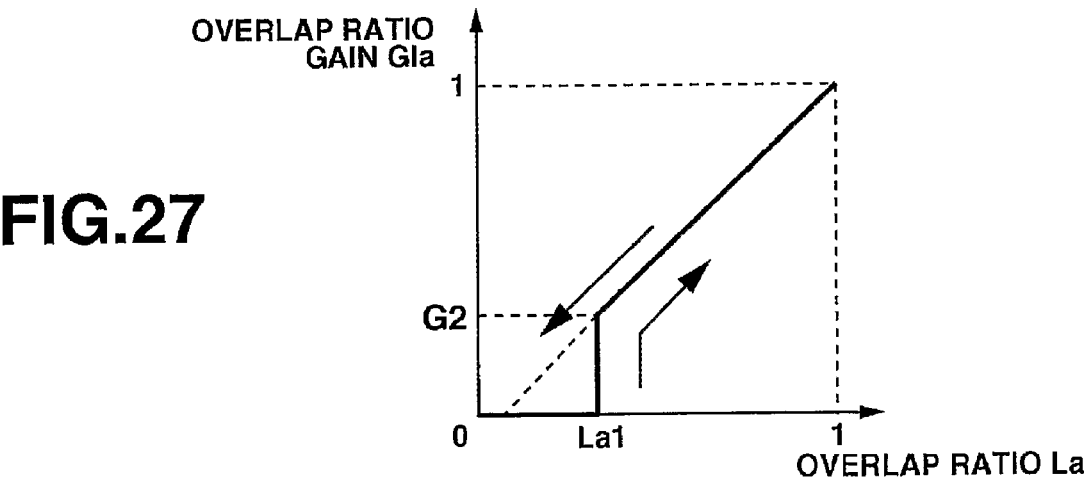
FIG. 27 is another form of an overlap-ratio gain (Gla) versus overlap ratio (La) characteristic.

FIGS. 25 to 27 show different examples of the relationship between overlap-ratio gain Gla and overlap ratio La.

With reference to FIG. 25, the overlap-ratio gain Gla remains 0 when the overlap ratio La is not greater than a predetermined value La1. Upon or after the overlap ratio La has exceeded the predetermined value La1, the overlap-ratio gain Gla gradually increases from 0 to 1. The overlap-ratio gain Gla is 1 when the overlap ratio La is 1. Thus, when the overlap ratio La is small, the repulsive force Fc is 0, and the repulsive force Fc gradually increases as the overlap ratio La increases. Therefore, braking/driving force control can be varied smoothly at the beginning or ending of the control.

With reference to FIG., 26, the overlap-ratio gain Gla remains 0 when the overlap ratio La is not greater than a predetermined value La1. Upon or after the overlap ratio La has exceeded the predetermined value La1, the overlap-ratio gain Gla gradually increases from a predetermined value G2 to 1. The overlap-ratio gain Gla is 1 when the overlap ratio La is 1. The predetermined value G2 is set at a value, which is, for example, approximately ½ to ⅕ of the maximum value of 1. Thus, a change in the repulsive force Fc may be identified clearly in a step-like manner. Via this change, the beginning or the ending of the braking/driving force control can be clearly transmitted to the driver.

With reference to FIG. 27, upon or after the overlap ratio La has exceeded the predetermined value La1 in the increasing direction, the overlap-ratio gain Gla gradually increases from a predetermined value G2 to 1. However, the overlap-ratio gain Gla gradually decreases from 1 to 0 as the overlap ratio La varies in the decreasing direction from 1 to 0. Thus, via a step change in repulsive force Fc, the beginning of the braking/driving force control can be clearly transmitted to the driver. When the overlap ratio La decreases due to operation to overtake the in-path target obstacle, the braking/driving force control is smoothly ended.

In each of the preceding embodiments, the overlap ratio La is calculated based on the width W and the lateral distance Δd, and the spring force C is corrected based upon the overlap ratio La to give the repulsive force Fc. This is just one example of giving the repulsive force Fc. The present invention is not limited to this example. Another example is to correct the spring force C based on the width W only to give the repulsive force Fc.

In the embodiments employing the flow charts of FIGS. 19 and 22, the feature illustrated in the flow chart of FIG. 17 may be applicable to calculate the repulsive force Fc based upon the width W only when it is determined that the vehicle is overtaking the in-path target obstacle.

In the embodiment employing the flow chart of FIG. 19, the accelerator pedal reaction force and the brake pedal reaction force are regulated after taking into account the risk from the in-path target obstacle. Regulation of the accelerator pedal reaction force and the brake pedal reaction force may be carried out without taking into account the risk.

In each of the preceding embodiments, the time headway THW is used to measure the possibility that the vehicle may come into contact with the in-path target obstacle. The use of THW is just one example. Another example is use of a time to collision TTC that is given by dividing the distance D by relative speed Vr. In this case, too, the repulsive force Fc is determined in the same manner.

In the preceding embodiments, the present invention is applied to a system where both driving force and braking force are regulated. However, the present invention may be applicable to a system where only driving force is regulated.

While the best modes for carrying out the invention have been described in detail, those familiar with the art to which the present invention relates will recognize various alternative designs and embodiments for practicing the invention as defined by the following claims.

INDUSTRIAL APPLICABILITY

As set forth above, according to a method and system for transmitting a detected in-path target obstacle to a driver of a vehicle of the present invention, a detected in-path target obstacle can be transmitted to a driver of a vehicle without providing any unacceptable input to the driver. Therefore, such a method and system is applicable to a variety of moving bodies such as automotive vehicles, with its application being expected in wide ranges.

The invention claimed is:

1. A system for assisting a driver operating a vehicle traveling on a road, the system comprising:
   a device arrangement configured to determine an obstacle as a target obstacle in a path of the vehicle and to determine information on the target obstacle and width of the target obstacle;
   a device configured to detect a status of the vehicle;
   a device configured to determine a risk that the vehicle may come into contact with the target obstacle based on the information on the target obstacle and the detected status of the vehicle; and
   a control arrangement configured to regulate a reaction force input to the driver based on the determined risk and to vary the reaction force input as the width of the target obstacle varies.

2. The system as recited in claim 1, wherein the control arrangement includes a controller configured to regulate the reaction force input to the driver in response to a control amount determined on the basis of the determined risk.

3. The system as recited in claim 2, wherein the device arrangement includes a width measurement device configured to measure a width of the target obstacle, and the control arrangement includes a correction device configured to correct the control amount on the basis of the measured width of the target obstacle.

4. The system as recited in claim 3, wherein the smaller the width of the target obstacle, the smaller the correction of the control amount.

5. The system as recited in claim 3, wherein the correction device is configured to correct the control amount on the basis of the measured width upon determining that the vehicle is overtaking the target obstacle.

6. The system as recited in claim 3, wherein the correction device is configured to correct the control amount on the basis of the measured width and an overlap between the target obstacle and the path.

7. The system as recited in claim 1, wherein the control arrangement is configured to regulate a reaction force from a driver controlled input device for longitudinal control of the vehicle.

8. The system as recited in claim 1, wherein the reaction force is from a driver controlled input device, wherein the control arrangement is configured to regulate the reaction force for lateral control of the vehicle.

9. The system as recited in claim 8, wherein the driver controlled input device is a steering wheel.

10. The system as recited in claim 1, wherein the path of the vehicle is an estimated path.

11. The system as recited in claim 6, wherein the control amount is variable with a gain, and wherein the correction device is configured to gradually increase the gain from a predetermined value as the overlap increases.

12. The system as recited in claim 6, wherein the control amount is variable with a gain, and wherein the correction device is configured to gradually increase the gain from 0 (zero) as the overlap increases after exceeding a predetermined value.

13. The system as recited in claim 6, wherein the control amount is variable with a gain, and wherein the correction device is configured to gradually increase the gain from a predetermined value as the overlap varies in increasing direction after exceeding a predetermined value, but gradually decreases the gain to 0 (zero) as the overlap varies in decreasing direction.

14. A vehicle comprising:
a device arrangement configured to determine an obstacle as a target obstacle in a path of the vehicle and to determine information on the target obstacle and width of the target obstacle;
a device configured to detect a status of the vehicle;
a device configured to determine a risk that the vehicle may come into contact with the target obstacle based on the information on the target obstacle and the detected status of the vehicle; and
a control arrangement configured to regulate a reaction force input to the driver based on the determined risk and to vary the reaction force input as the width of the target obstacle varies.

15. The vehicle as recited in claim 14, wherein the device arrangement includes a width measurement device configured to measure a width of the target obstacle, and the control arrangement includes a controller configured to regulate the reaction force input to the driver in response to a control amount determined on the basis of the determined risk, and, a correction device that corrects the control amount on the basis of the measured width of the target obstacle.

16. A system for assisting a driver operating a vehicle traveling on a road, the system comprising:
means for determining an obstacle as a target obstacle in a path of the vehicle and determining information on the target obstacle and width of the target obstacle;
means for detecting status of the vehicle;
means for determining a risk that the vehicle may come into contact with the target obstacle based on the information on the target obstacle and the detected status of the vehicle; and
means for regulating a reaction force input to the driver based on the determined risk and varying the reaction force input as the width of the target obstacle varies.

17. The system as recited in claim 16, further comprising means for measuring the width of the target obstacle; and means for regulating includes: means for regulating the reaction force input to the driver in response to a control amount determined on the basis of the determined risk; and means for correcting the control amount on the basis of the measured width of the target obstacle.

18. The system as recited in claim 2, wherein the device arrangement is configured to determine a lateral deviation ($\Delta d$) of the vehicle from a centerline of a lane on the road, and a width (W) of the target obstacle, and the control arrangement calculates an overlap ratio (La) that is expressed as:

$$La = 1 - \Delta d / W.$$

19. The system as recited in claim 18, wherein the control arrangement is configured to determine an overlap ratio gain against the overlap ratio.

20. The system as recited in claim 19, wherein the control arrangement includes a correction device configured to calculate a repulsive force, wherein the system is configured to use the repulsive force in a calculation to correct the control amount on the basis of the overlap ratio gain.

21. The system as recited in claim 20, wherein the correction device is configured to calculate the repulsive force on the basis of the overlap ratio gain when the determined risk is greater than or equal to a predetermined value.

22. The system as recited in claim 21, wherein the correction device is configured to set the repulsive force to a zero value when the determined risk is less than the predetermined value.

23. The system as recited in claim 18, wherein the control arrangement is configured to determine a correction coefficient against the overlap ratio.

24. The system as recited in claim 23, wherein the control arrangement includes a correction device configured to multiply the correction coefficient with a steering reaction force reduction amount that is determined in regard to the determined risk.

* * * * *